United States Patent [19]

Nielsen

[11] Patent Number: 5,132,073
[45] Date of Patent: Jul. 21, 1992

[54] PROCESS FOR MAKING A CORRUGATED TUBE

[75] Inventor: David L. Nielsen, Manton, Mich.

[73] Assignee: Cadillac Rubber & Plastics, Inc., Cadillac, Mich.

[21] Appl. No.: 631,662

[22] Filed: Dec. 20, 1990

[51] Int. Cl.⁵ .................. B29C 35/04; B29C 23/18
[52] U.S. Cl. ......................... 264/506; 264/322; 264/DIG. 42; 425/387.1; 425/393; 425/403
[58] Field of Search ............ 264/506, 512, 514, 236, 264/347, DIG. 42, DIG. 52, 544, 500, 507, 508, 552, 322, 320, 297.5; 425/387.1, 393, 812, 384, 403

[56] References Cited

U.S. PATENT DOCUMENTS

| 1,665,309 | 4/1928 | Laursen | 264/500 |
| 2,699,575 | 1/1955 | Haury | 425/393 |
| 2,903,744 | 9/1959 | Harrison | 264/DIG. 52 |

FOREIGN PATENT DOCUMENTS 651097  3/1951  United Kingdom ............. 264/506

*Primary Examiner*—Jan H. Silbaugh
*Assistant Examiner*—Catherine Timm
*Attorney, Agent, or Firm*—Varnum, Riddering, Schmidt & Howlett

[57] ABSTRACT

A corrugated elastomeric tube having a smooth interior surface (28) generally free from nipples is produced. A first step in the process is carried out by positioning an unvulcanized elastomeric tubing (14) over a mandrel (12) having a corrugated outer surface (13). The mandrel (12) has an exterior surface (30) which is free from holes. Next, each end of the tubing (14) is clamped to the mandrel (12). The tubing (14) and the mandrel (12) are heated to soften and vulcanizing the tubing (14). Also, pressure is provided to cause the tubing (14) to conform with the corrugated outer surface (13) of the mandrel (12). The vulcanized corrugated tube is then removed from the mandrel (12).

11 Claims, 3 Drawing Sheets

PROCESS FOR MAKING A CORRUGATED TUBE

BACKGROUND OF THE INVENTION

1. Field of the Invention

This invention relates to a process for making a corrugated elastomeric tube which has an interior surface generally free from nipples, whereby the tube may be produced in a cost efficient manner.

2. Description of the Related Art

Corrugated elastomeric tubing has many applications, most of them involving a fluid which flows through the tubing. One possible application of the tubing is as a fuel line in automobiles. Presently, one type of process used for producing corrugated tubing causes nipples to be formed on the interior of the tubing. These nipples often break off when a fluid flows through the tubing, thereby potentially clogging a fuel filter, a carburetor or a fuel injector.

One such process having the potential for forming nipples on the interior surface of the tubing is described in British Pat. No. 1,167,146 which was published Oct. 15, 1969. This patent describes a method for manufacturing a corrugated tubing wherein the tubing is placed on a mandrel having an internal space or cavity. The tubing is sealed onto the mandrel at both ends. The exterior surface of the mandrel includes a plurality of convolutions. The gaps between the convolutions are in open communication with the cavity of the mandrel by way of ports. In operation, the tubing, while supported on the mandrel, is vulcanized or cured in an autoclave which forces the rubber of the tubing about the convolutions on the mandrel. The air trapped between the rubber tubing and the mandrel is forced into the cavity during the vulcanizing process so that the rubber lies flat against the mandrel as it is vulcanized. The rubber, being soft during the vulcanizing process, can flow into the holes in the mandrel and form nipples inside the tubing. In addition, sink holes can form in the exterior surface of the tubing over the mandrel holes. These same problems also may occur in processes wherein a vacuum is drawn on the interior of the mandrel.

Other processes known in the prior art utilize beads which wrap around the exterior surface of the elastomeric tubing in a helical manner to rigidly secure the underlying tubing to the mandrel. One such process is disclosed in U.S. Pat. No. 2,936,812, issued May 17, 1960 to Roberts. Corrugations in the tubing are formed by forcing air into an interior hollow space of the mandrel. This air then communicates with the exterior surface of the mandrel by means of mandrel ports. The air pressure forces the tubing between the beads to extend away from the mandrel, thus forming convolutions in the tubing because other parts of the tubing are secured to the mandrel by the beads. Production of many sections of the tubing using such a process can be somewhat expensive.

Other processes for producing such corrugated tubing sections are also known. A third such process is a process like that disclosed in U.S. Pat. No. 2,248,898, issued Jul. 8, 1941 to Ross et al. The process utilizes two mold halves which are clamped together. An elastomeric material is inserted within the mold halves, and air pressure is also supplied to the interior of the mold halves. The air pressure causes the elastomeric material to form a corrugated tube which conforms to the corrugated shape of the mold halves. Once again, it is generally expensive to produce tubing according to this process.

Thus, there is a need for a process of producing corrugated tubing which has a smooth interior surface free from nipples. Furthermore, it would be desirable to produce such an improved corrugated tubing in a cost efficient manner.

SUMMARY OF THE INVENTION

According to the invention, there is provided a process for making a corrugated tube comprising the steps of positioning an unvulcanized or partially vulcanized elastomeric tubing over a mandrel having a corrugated outer surface, clamping the ends of the tubing to the mandrel to seal the ends of the tubing to the mandrel, thereby trapping gas between the tubing and the mandrel, heating the tubing and the mandrel to soften and vulcanize the tubing while pressurizing the exterior surface of the tubing to conform with the exterior surface of the mandrel for a time sufficient to vulcanize the elastomeric tubing in the corrugated shape while maintaining the trapped gas between the tubing and the mandrel, and thereafter removing the vulcanized corrugated tubing from the mandrel.

The tubing is preferably a cylindrical tubing which can be formed of many different materials. Examples of such elastomeric materials are: nitrile rubber, natural rubber, reclaimed rubber, isoprene (synthetic) rubber, styrene butadiene rubber, butadiene rubber, butyl rubber, chlorobutyl rubber, bromobutyl rubber, polysulfide rubber, ethylene propylene copolymer (EPM), ethylene propylene diene terpolymer (EPDM), polychloroprene, epichlorohydrin homopolymer, epichlorohydrin/ethylene oxide copolymer, chlorinated polyethylene, chlorosulfonated polyethylene, polyacrylate rubber, polyurethane-ester type, polyurethane-ether type, silicone rubber, fluorosilicone rubber, fluorocarbon rubber, and blends thereof. Preferably, the elastomeric tubing comprises nitrile rubber.

The conditions under which the tubing is formed can vary over a wide range depending on the type of rubber used. Higher temperatures require less time than lower temperatures. Generally, the temperature is in the range of about 300°-350° F.

The pressure to which the tubing is subjected during the heating step can also vary over a wide range. The pressures are sufficient to force the elastomeric tubing to conform with the exterior corrugated shape of the mandrel. These pressures will generally be in the range of 80 psig to about 120 psig during the heating step. A pressure of about 100 psig is preferred.

The time for which the tubing is heated can also vary over a wide range, depending on the type of material and the temperature to which the tubing is heated. Generally, the heating time will be in the range of about 15 minutes to about 30 minutes.

BRIEF DESCRIPTION OF THE DRAWINGS

The invention will now be described with reference to the drawings in which.

DETAILED DESCRIPTION OF THE DRAWINGS

To carry out the present invention, some type of core must be used over which the elastomeric material is placed for forming and vulcanizing or curing purposes. In the preferred embodiment, a hollow metallic mandrel is used.

Figure 1:
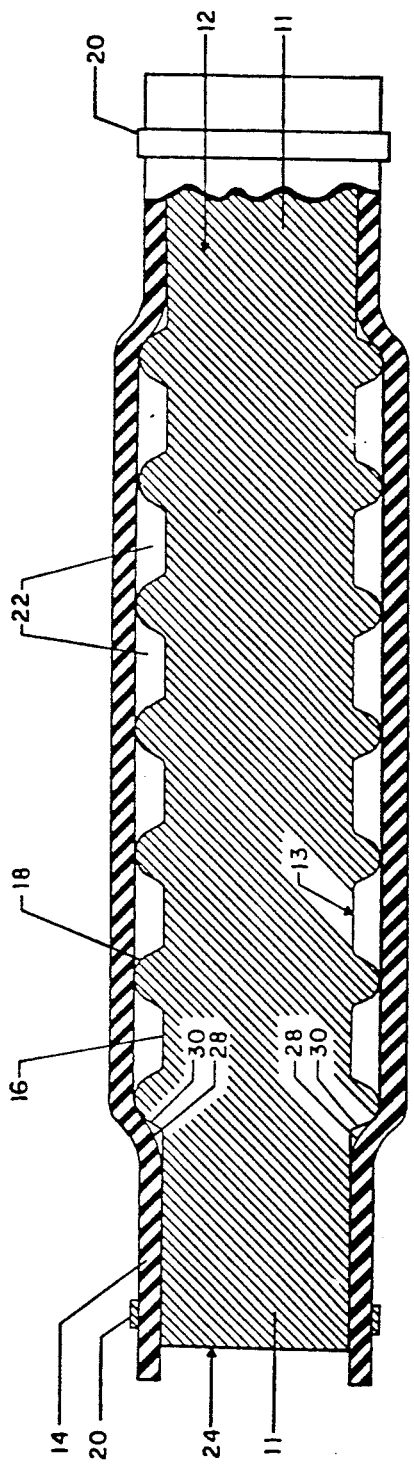
FIG. 1 is a sectional view of a mandrel with an elastomeric tubing clamped in position illustrating a first step in the method according to the invention.

As seen in FIG. 1, a mandrel 12 includes straight portions 11 and a corrugated outer surface 13. The mandrel 12 is made of a suitable metal, e.g. steel, formed by casting or machining processes which are well known in the art. The corrugated outer surface 13 consists of alternating troughs 16 and crests 18. As illustrated, the mandrel is solid and the mandrel body is free from holes in the exterior surface 30. During a first step of the process, an unvulcanized elastomeric tubing 14 is positioned adjacent the mandrel exterior surface and fastened to the straight portions 11 of the mandrel by a clamping means. The clamping means can comprise a band of rubber 20 adapted to securely fasten the tubing to the straight portions 11 of the mandrel. After fastening of the clamping means to the tubing, pockets of trapped gas 22 are encased between the mandrel 12 and the tubing 14.

A resulting assembly 24 comprised of the mandrel, the tubing, and the clamping means is then placed in an autoclave for forming the tubing into the desired shape and vulcanizing or curing. The use of an autoclave for purposes of forming and vulcanizing or curing an elastomeric material is well known in the art as illustrated and described in Weinandy, U.S. Pat. No. 3,015,857, issued Jan. 9, 1962. Heat provided by steam in the autoclave causes the elastomeric tubing to soften and become more pliable. Steam pressure inside the autoclave compresses the tubing to conform to the shape of the mandrel although the tubing is slightly larger than the mandrel to assist in removing the tubing from the mandrel.

Figure 2:
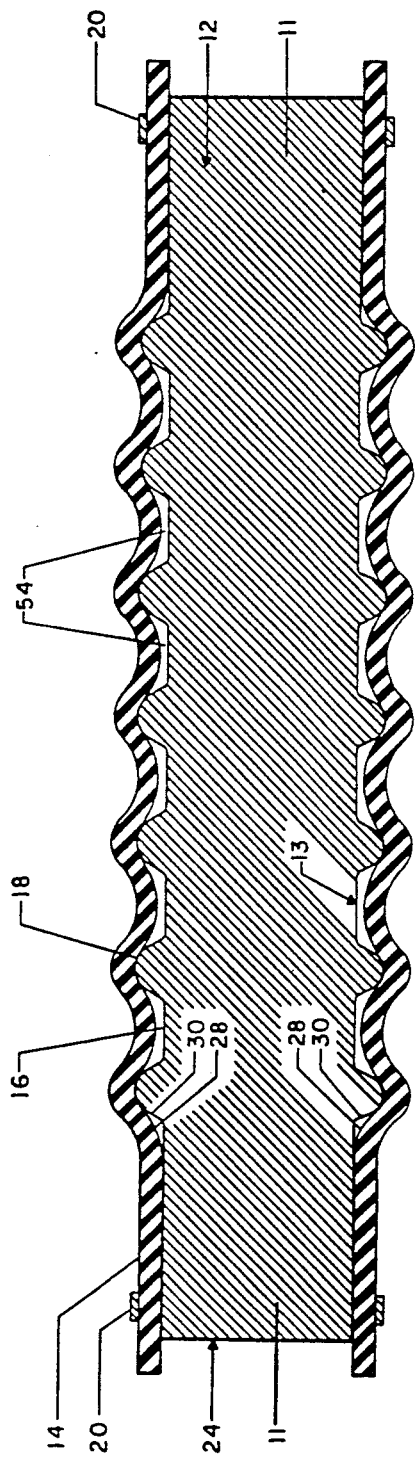
FIG. 2 is a sectional view of the mandrel and elastomeric tubing illustrating a second step according to the invention.

FIG. 2 shows the tubing and mandrel during a second step of the process of making the corrugated tubing. As seen in FIG. 2, the tubing 14 has been deformed such that portions of the tubing adjacent the crests 18 of the mandrel 12 generally conform to the shape of the crests 18 and also bear against the crests 18. However, other portions of the tubing adjacent the troughs 16 of the mandrel 12 do not bear against the troughs 16. Pockets of trapped gas 54 are provided between the tubing and the mandrel at these portions of the tubing.

Figure 3:
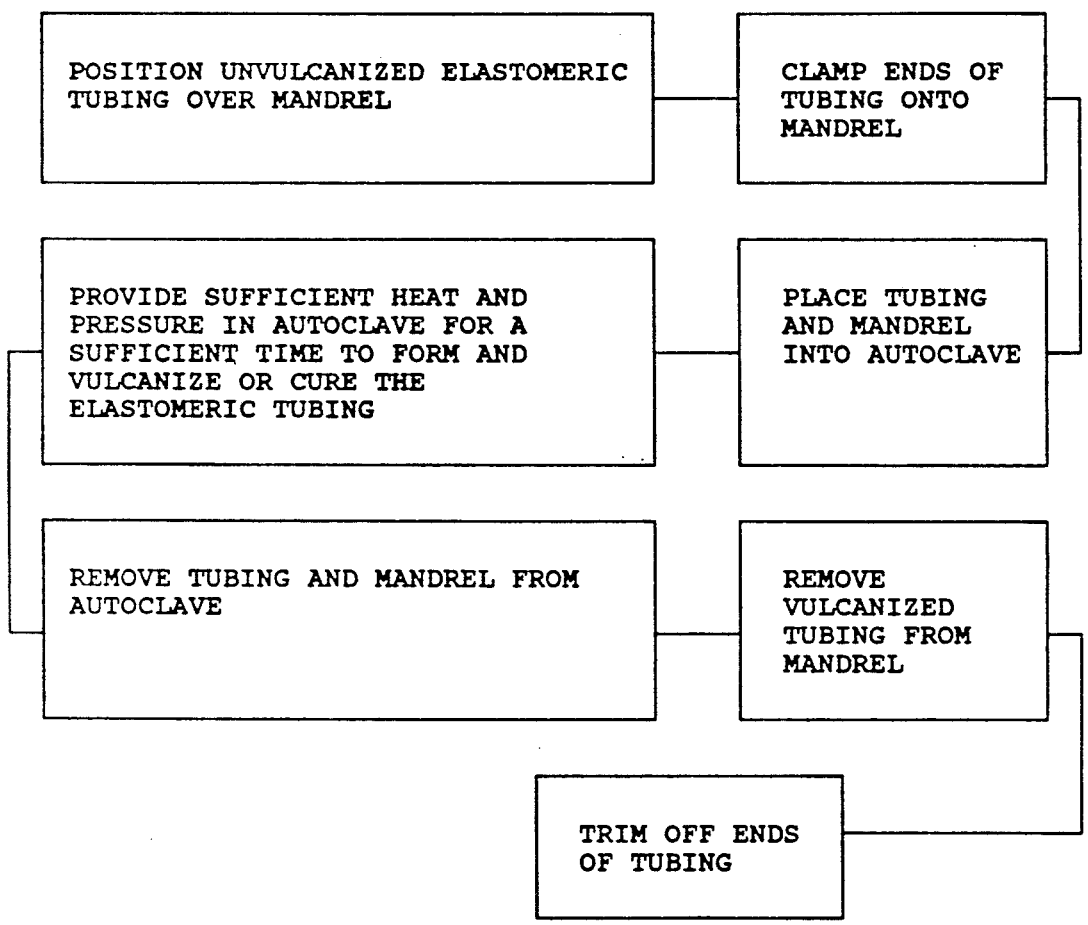
FIG. 3 is a block diagram flow chart illustrating the steps used in forming and vulcanizing or curing an elastomeric tubing according to the invention.

FIG. 3 illustrates the steps used in forming and vulcanizing an elastomeric tubing according to the invention. As illustrated in FIG. 3, the elastomeric tubing 14 is positioned over the mandrel 12 and then the ends of the tubing clamped to the mandrel. The tubing 14 and the mandrel 12 are placed into an autoclave 32. Heat and pressure are then applied to the tubing for a time sufficient to form and vulcanize the tubing. The tubing and the mandrel can then be removed from the autoclave, and the tubing removed from the mandrel by use of a conventional air tool as described in further detail below. A trimming operation is then used to trim off each end of the tubing at a point just inside the point on the tubing where the clamping means 20 is located. Thus, because the portion of the tubing having the clamping means attached to it is trimmed off, the clamping means never has to be removed in a separate operation.

Figure 4:
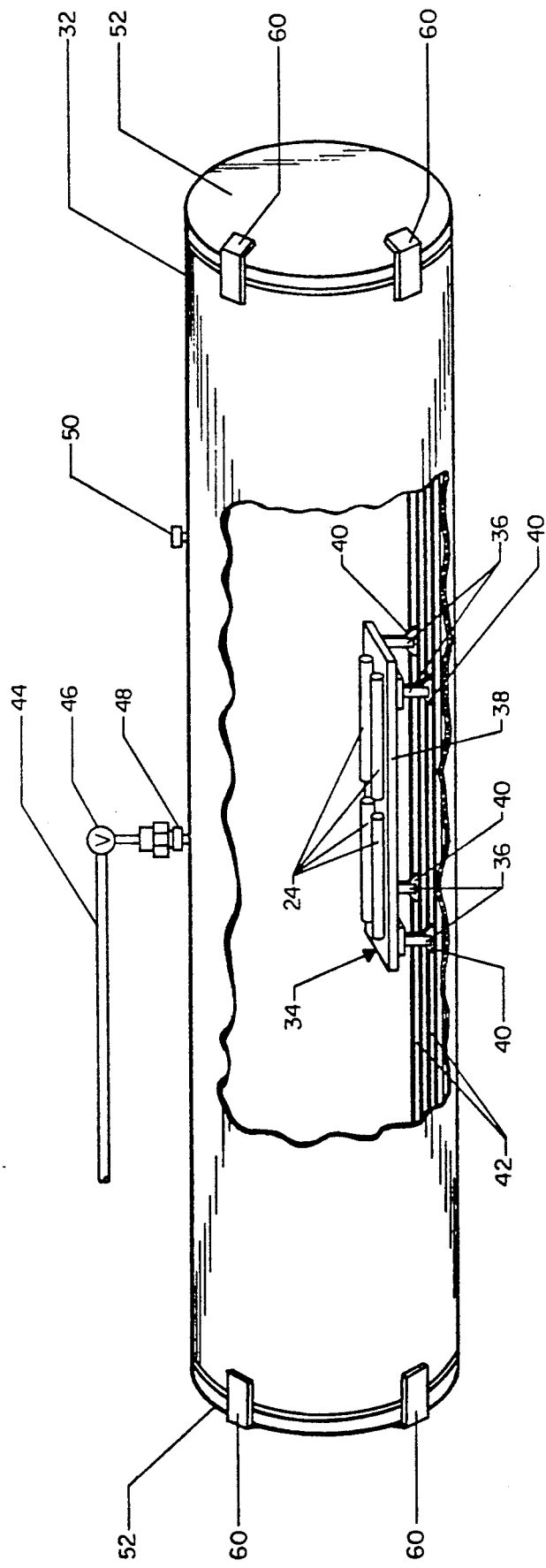
FIG. 4 is a perspective view of a mandrel and tubing positioned on a wagon inside an autoclave during formation and vulcanization of the tubing.

As shown in FIG. 4, a suitable autoclave for shaping and vulcanizing many sections of tubing simultaneously can comprise a hollow elongated cylinder 32 capable of enclosing within it a wagon 34 having many mandrel assemblies 24 placed thereon for shaping and vulcanizing. The wagon preferably includes vertical support legs 36 supporting a frame of the wagon 38 and extending downwardly to four or more wheels 40 rotatively coupled to the support legs 36. The wheels 40 preferably rest upon two beams 42 which lie on a generally flat bottom surface of the autoclave and extend longitudinally of the cylindrical autoclave, in a manner similar to a train resting on railroad tracks. Both the heat and the pressure inside the autoclave are provided by saturated steam which is directed into the autoclave by a steam inlet pipe 44, a steam inlet valve 46 and a steam fitting 48. After vulcanization of the wagon load of mandrel assemblies has taken place, the pressure inside the autoclave can be reduced to atmospheric pressure by opening a pressure relief valve 50. After unlatching one or more door securing means 60, both autoclave doors 52 can be opened. After shaping and vulcanization of the mandrel assemblies 24 has taken place, the wagon can be easily pushed out of the autoclave and a wagon load of unshaped tubing sections can then be pushed into the autoclave.

A preferred range of temperatures inside the autoclave for shaping and vulcanizing the tubing is 300° F. to 350° F. A preferred range of time for shaping and vulcanizing is 15 minutes to 30 minutes. A preferred range of pressures inside the autoclave is 80 psig to 120 psig.

After the wagon load of mandrel assemblies has been removed from the autoclave, the vulcanized tubing can be removed from the mandrel. One method of removing the tubing is by use of an air tool which is well known in the industry. The conventional air tool can be clamped to an end of the vulcanized tubing and can then inject a stream of air between an interior surface 28 of the tubing and the exterior surface 30 of the mandrel. Because the tubing is vulcanized (elastic), it can be expanded by the stream of air such that the tubing can then be easily slipped off the mandrel. After the tubing is removed, it automatically retracts to its normal vulcanized shape, the shape it had before the air tool was used. The vulcanized tubing is slightly larger than the mandrel due to the pockets of trapped gas 54 between the tubing and the mandrel. This slight size difference assists in removing the vulcanized tubing from the mandrel.

The elastomeric tubing material used is preferably a nitrile rubber. However, the following materials can also be used: natural rubber, reclaimed rubber, isoprene (synthetic) rubber, styrene butadiene rubber, butadiene rubber, butyl rubber, chlorobutyl rubber, bromobutyl rubber, polysulfide rubber, ethylene propylene copolymer (EPM), ethylene propylene diene terpolymer (EPDM), polychloroprene, epichlorohydrin homopolymer, epichlorohydrin/ethylene oxide copolymer, chlorinated polyethylene, chlorosulfonated polyethylene, polyacrylate rubber, polyurethane-ester type, polyurethane-ether type, silicone rubber, fluorosilicone rubber, fluorocarbon rubber, and blends thereof.

The present invention does not require communication between a hollow space in the mandrel and an exterior surface of the mandrel. Many processes in the prior art do require this type of communication, and thus require a hollow mandrel having ports which allow the hollow space in the mandrel to communicate with the exterior surface of the mandrel. The process of the present invention has many advantages over these prior art processes. First, in these prior art processes, the elastomeric material of the tubing tends to flow into the communication ports, thereby causing nipples to form on the interior surface of the tubing. When a fluid flows through the finished tubing, the nipples can break off and be carried along with the fluid stream. Since a possible application of the tubing is as a fuel line, any nipples which break off may clog a fuel filter, a carburetor or a fuel injector. Because the process of the present invention eliminates these communication ports, nipples are not formed on the interior surface of the tubing. Second, in the prior art processes, at any point along the tubing where a nipple was formed on the interior of the tubing, a corresponding sink mark or dimple may have formed on the exterior of the tubing. These dimples or sink marks provided points of weakness in the tubing and, therefore, were undesirable. The process of the present invention prevents formation of these dimples or sink marks on the exterior of the tubing. Third, the communication ports in the prior art processes tended to clog with elastomeric material during the shaping (forming) operation. Because the process of the present invention eliminates these ports, this clogging problem is eliminated. Fourth, because no nipples are formed on the interior surface of the tubing produced in accordance with the present invention, it is easier to remove the finished tubing from the mandrel. Fifth, the cost of manufacturing a mandrel without ports or any central cavity is less expensive than manufacturing a mandrel with ports and a central cavity. Thus, overall costs for producing the tubing are reduced.

EXAMPLE

A corrugated tubing made of nitrile rubber was made by positioning an unvulcanized nitrile rubber tubing over a mandrel similar to the mandrel 12 illustrated in FIGS. 1 and 2. After clamping each end of the tubing onto the mandrel by use of rubber bands, the tubing and the mandrel were placed into an elongated cylindrical autoclave. The autoclave doors were secured and steam was introduced into the autoclave in such a manner that the tubing was heated for 20 minutes at a temperature of 350° F. in order to form and vulcanize the elastomeric tubing. The pressure inside the autoclave was then reduced to atmospheric pressure by opening a pressure relief valve on the autoclave. The doors of the autoclave were opened. A wagon load of mandrel assemblies were then removed from the autoclave. A conventional air tool was used to force air between the mandrel and the vulcanized tubing in order to remove the tubing from the mandrel. The ends of the tubing were then trimmed off at a point on the tubing just inside where the rubber bands were located.

Upon inspection, the vulcanized tubing had an outer corrugated surface and a smooth corrugated interior surface, free of dimples or nipples.

Reasonable variation and modification are possible within the spirit of the foregoing specification and drawings without departing from the scope of the invention. For example, the mandrel 12 may be hollow, not solid, and need not be metallic as long as it is able to maintain its shape during the process of the present invention. Also, the unformed tubing can be partially vulcanized instead of unvulcanized. Furthermore, the autoclave can comprise any enclosure which is capable of providing sufficient pressure and temperature to shape and vulcanize the tubing. Other process times, temperatures and pressures could also be used. For example, shaping and vulcanizing of the tubing could take place at a lower temperature than 300° F. provided a sufficient time (longer than 30minutes) for shaping and vulcanizing was provided.

The embodiments for which an exclusive property or privilege is claimed are defined as follows:

1. A process for making a corrugated tube comprising the steps of:
    positioning an unvulcanized or partially vulcanized elastomeric tubing over a mandrel having a corrugated outer surface which is free of vent holes, the outer surface comprising a series of alternating crests and troughs;
    clamping each end of the tubing to the mandrel to seal the ends of the tubing to the mandrel, thereby trapping gas between the tubing and the troughs of the mandrel;
    heating the tubing and the mandrel to soften and vulcanize the tubing and pressurizing the exterior surface of the tubing to generally conform the interior surface of the tubing with the exterior surface of the mandrel so that portions of the shaped tubing adjacent the crests conform to the shape of the crests while the portions of the shaped tubing adjacent the troughs remain somewhat separated from the troughs by pockets of trapped gas and a corrugated shape is obtained, the heating and pressurizing being applied for a time sufficient to vulcanize the elastomeric tubing in the corrugated shape while maintaining the trapped gas between the tubing and the troughs of the mandrel; and
    removing the thus vulcanized corrugated tubing from the mandrel.

2. A process for making a corrugated tube according to claim 1 wherein the tubing is heated to a temperature in the range from about 300° F. to about 350° F.

3. A process for making a corrugated tube according to claim 2 wherein the tubing is subjected to pressures in the range from about 80 psig to about 120 psig during the heating step.

4. A process for making a corrugated tube according to claim 3 wherein the tubing is heated under pressure for a time in the range of about 15 minutes to about 30 minutes.

5. A process for making a corrugated tube according to claim 4 wherein the elastomeric tubing is selected from the group consisting of nitrile rubber, natural rubber, isoprene (synthetic) rubber, styrene butadiene rubber, butadiene rubber, butyl rubber, chlorobutyl rubber, bromobutyl rubber, polysulfide rubber, ethylene propylene copolymer (EPM), ethylene propylene diene terpolymer (EPDM), polychloroprene, epichlorohydrin homopolymer, epichlorohydrin/ethylene oxide copolymer, chlorinated polyethylene, chlorosulfonated polyethylene, polyacrylate rubber, polyurethane-ester type, polyurethane-ether type, silicone rubber, fluorosilicone rubber, fluorocarbon rubber, and blends thereof.

6. A process for making a corrugated tube according to claim 5 wherein the elastomeric tubing comprises nitrile rubber.

7. A process for making a corrugated tube according to claim 1 wherein the tubing is subjected to pressures in the range from about 80 psig to about 120 psig during the heating step.

8. A process for making a corrugated tube according to claim 1 wherein the tubing is heated under pressure for a time in the range of about 15 minutes to about 30 minutes.

9. A process for making a corrugated tube according to claim 1 wherein the elastomeric tubing is selected from the group consisting of nitrile rubber, natural rubber, isoprene (synthetic) rubber, styrene butadiene rubber, butadiene rubber, butyl rubber, chlorobutyl rubber, bromobutyl rubber, polysulfide rubber, ethylene propylene copolymer (EPM), ethylene propylene diene terpolymer (EPDM), polychloroprene, epichlorohydrin homopolymer, epichlorohydrin/ethylene oxide copolymer, chlorinated polyethylene, chlorosulfonated polyethylene, polyacrylate rubber, polyurethane-ester type, polyurethane-ether type, silicone rubber, fluorosilicone rubber, fluorocarbon rubber, and blends thereof.

10. A process for making a corrugated tube according to claim 1 wherein the elastomeric tubing comprises nitrile rubber.

11. A process for making a corrugated tube according to claim 1 wherein the mandrel is solid throughout its length.

* * * * *